(12) United States Patent
Fujimoto et al.

(10) Patent No.: US 12,474,527 B2
(45) Date of Patent: Nov. 18, 2025

(54) OPTICAL COUPLING DEVICE AND OPTICAL COUPLING SYSTEM

(71) Applicant: NTT, Inc., Tokyo (JP)

(72) Inventors: Tatsuya Fujimoto, Musashino (JP);
Hidenobu Hirota, Musashino (JP);
Takui Uematsu, Musashino (JP);
Tomohiro Kawano, Musashino (JP);
Hiroyuki Iida, Musashino (JP); Ryo Koyama, Musashino (JP); Tetsuya Manabe, Musashino (JP); Kazunori Katayama, Musashino (JP)

(73) Assignee: NTT, Inc., Tokyo (JP)

( * ) Notice: Subject to any disclaimer, the term of this patent is extended or adjusted under 35 U.S.C. 154(b) by 320 days.

(21) Appl. No.: 18/019,113

(22) PCT Filed: Aug. 7, 2020

(86) PCT No.: PCT/JP2020/030482
§ 371 (c)(1),
(2) Date: Feb. 1, 2023

(87) PCT Pub. No.: WO2022/030016
PCT Pub. Date: Feb. 10, 2022

(65) Prior Publication Data
US 2023/0314715 A1     Oct. 5, 2023

(51) Int. Cl.
*G02B 6/28*     (2006.01)
(52) U.S. Cl.
CPC ................ *G02B 6/2821* (2013.01)

(58) Field of Classification Search
CPC .................................................. G02B 6/2821
See application file for complete search history.

(56) References Cited

U.S. PATENT DOCUMENTS 5,042,896 A * 8/1991 Dahlgren ............... G02B 6/283
                                                                                 385/126
5,675,679 A * 10/1997 Yuuki .................. G02B 6/2856
                                                                                 385/96

(Continued)

FOREIGN PATENT DOCUMENTS

JP          H11174347          7/1999
WO       WO 2016047122      3/2016

OTHER PUBLICATIONS

FiberLabs Inc., "Technology, what are the principles and applications of fiber optic couplers?" fiberlabs.co.jp, retrieved on Aug. 1, 2020, retrieved from URL <https://www.fiberlabs.co.jp/tech-explan/about-fiber-coupler/>, 11 pages (with English Translation).

(Continued)

*Primary Examiner* — Uyen Chua N Le
*Assistant Examiner* — Hoang Q Tran
(74) *Attorney, Agent, or Firm* — Fish & Richardson P.C.

(57) ABSTRACT

An object of the present disclosure is to provide an optical coupling device capable of controlling a coupling rate of optical coupling between two coupling optical fibers.
An optical coupling device of the present disclosure includes two coupling optical fibers each including a core and a clad and, between the two coupling optical fibers, a thickness variable member having a thickness between the two coupling optical fibers that varies by irradiation with light.

10 Claims, 21 Drawing Sheets

(56) References Cited

U.S. PATENT DOCUMENTS 6,968,103 B1 * 11/2005 Schroll ................ G02B 6/2835
385/27
10,101,550 B1 * 10/2018 Hsia ..................... G02B 6/4432

OTHER PUBLICATIONS

Kanamori, "Passive optical components and their application to FTTH networks," Sumitomo Electric Technical Review, Jul. 2011, retrieved from URL <https://sei.co.jp/technology/tr/bn179/pdf/sei10675.pdf>, 179:17-24, 17 pages (with English Translation).

* cited by examiner

[1]

Fig. 7A
[7A]
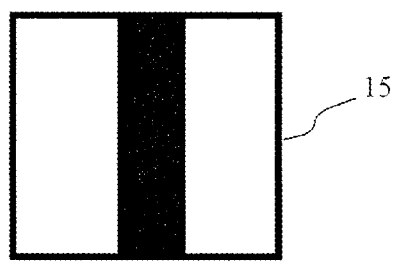
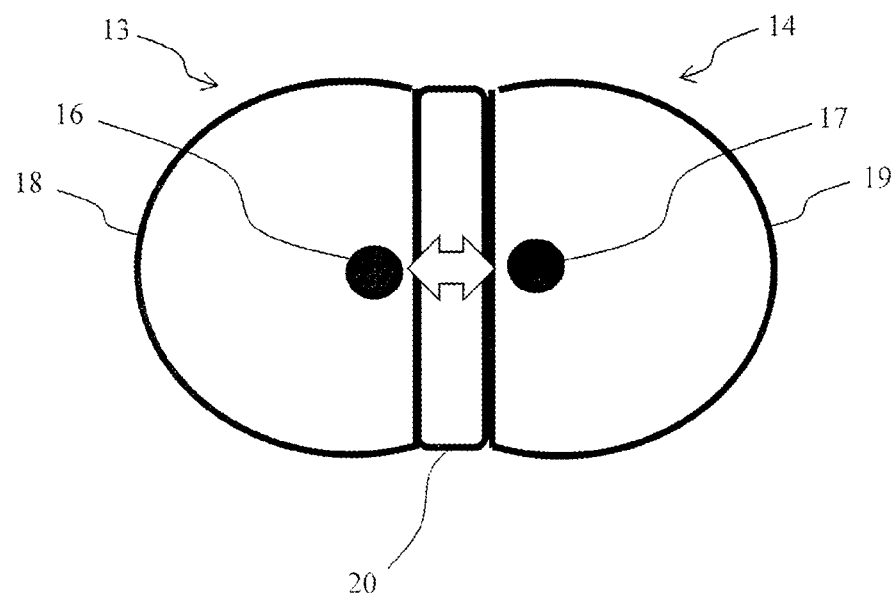

OPTICAL COUPLING DEVICE AND OPTICAL COUPLING SYSTEM

CROSS-REFERENCE TO RELATED APPLICATIONS

This application is a National Stage application under 35 U.S.C. § 371 of International Application No. PCT/JP2020/030482, having an International Filing Date of Aug. 7, 2020. The disclosure of the prior application is considered part of the disclosure of this application, and is incorporated by reference in its entirety into this application.

TECHNICAL FIELD

The present disclosure relates to an optical coupling device and an optical coupling system that cause light to branch and merge using optical fibers.

BACKGROUND ART

The number of users of services using optical fibers is increasing day by day due to the speed of communication. FIG. 1 illustrates the amount of optical cables that have been laid in Japan for the approximately twenty years. Optical cables are laid day by day, exceeding one million kilometers in the country. The significant increase in the amount of optical cables indicates that the demand by users for the services using optical fibers is large.

To provide a service using an optical fiber, transmission devices are required to be connected to both ends of the optical fiber. FIG. 2 illustrates an example of an optical access system. In FIG. 2, a reference numeral 11 denotes an optical fiber (#1), a reference numeral 51 denotes a user's home (#1), a reference numeral 53 denotes a communication building, a reference numeral 54 denotes an optical line terminal (OLT), and a reference numeral 55 denotes an optical network unit (ONU) (#1).

The OLT 54 is installed in the communication building 53, the ONU (#1) 55 is installed in the user's home (#1) 51, and the OLT 54 and the ONU (#1) 55 communicate with each other via the optical fiber (#1) 11, so that a service using an optical fiber is provided.

Furthermore, in a case where a new user desires a service using an optical fiber, a new optical fiber is required to be laid. FIG. 3 illustrates an example of laying a new optical fiber. In FIG. 3, a reference numeral 11 denotes the optical fiber (#1), a reference numeral 12 denotes an optical fiber (#2), a reference numeral 51 denotes the user's home (#1), a reference numeral 52 denotes a user's home (#2), a reference numeral 53 denotes the communication building, a reference numeral 54 denotes the OLT, a reference numeral 55 denotes the ONU (#1), and a reference numeral 56 denotes an ONU (#2).

The ONU (#2) 56 is newly installed in the user's home (#2) 52 and the OLT 54 is connected to the ONU (#2) 56 via the optical fiber (#2) 12, so that a service using an optical fiber is newly provided.

Conventionally, in a case where a user desires a service using an optical fiber, construction for laying the new optical fiber (#2) 12 is required to be performed between the communication building 53 and the user's home (#2) 52 as illustrated in FIG. 3. On the other hand, in a situation where construction workers are reduced, there is a possibility that a delay occurs in the optical fiber laying construction.

In order to solve this issue, the period of the optical fiber laying construction can be shortened by an optical fiber being processed at the construction site. FIGS. 4A and 4B illustrate a manufacture example of an optical coupler in which optical fibers are processed. In FIGS. 4A and 4B, a reference numeral 11 denotes the optical fiber (#1), a reference numeral 12 denotes the optical fiber (#2), a reference numeral 41 denotes a core (#1), a reference numeral 42 denotes a core (#2), a reference numeral 43 denotes a clad (#1), a reference numeral 44 denotes a clad (#2), and a reference numeral 57 denotes an optical coupler.

As illustrated in FIG. 4A, the optical fiber (#1) 11 and the optical fiber (#2) 12 are arranged in parallel, and as illustrated in FIG. 4B, a region of the optical fiber (#1) 11 and the optical fiber (#2) 12 surrounded by broken lines is melted (see Non Patent Literature 1 and Non Patent Literature 2). Since melting the optical fibers brings the core (#1) 41 of the optical fiber (#1) 11 closer to the core (#2) 42 of the optical fiber (#2) 12, optical coupling occurs between the optical fiber (#1) 11 and the optical fiber (#2) 12. Light from the optical fiber (#1) 11 can branch into the optical fiber (#2) 12, and light from the optical fiber (#2) 12 can merge into the optical fiber (#1) 11.

If the optical coupler can be manufactured at a construction site, the construction can be sped up. FIG. 5 illustrates an example of an optical access system using an optical coupler. In FIG. 5, a reference numeral 11 denotes the optical fiber (#1), a reference numeral 12 denotes the optical fiber (#2), a reference numeral 51 denotes the user's home (#1), a reference numeral 52 denotes the user's home (#2), a reference numeral 53 denotes the communication building, a reference numeral 54 denotes the OLT, a reference numeral 55 denotes the ONU (#1), a reference numeral 56 denotes the ONU (#2), and a reference numeral 57 denotes the optical coupler.

The ONU (#2) 56 is newly installed in the user's home (#2) 52, and the OLT 54 and the ONU (#2) 56 communicate with each other via the optical fiber (#1) 11, the optical coupler 57, and the optical fiber (#2) 12, so that a service using an optical fiber is additionally provided. The OLT 54, the ONU (#1) 55, and the ONU (#2) 56 are illustrated as passive optical network (PON) transmission devices.

Conventionally, in a case where a user desires a service using an optical fiber, construction for laying the new optical fiber (#2) 12 has been required to be performed between the communication building 53 and the user's home (#2) 52 as illustrated in FIG. 3. If the optical coupler 57 can be manufactured at a construction site, the optical fiber (#1) 11 from the communication building 53 to the optical coupler 57 can be shared, and the construction period can be shortened.

CITATION LIST

Non Patent Literature

Non Patent Literature 1: https://www.fiberlabs.co.jp/tech-explan/about-fiber-coupler/, "Principle and application of optical fiber coupler"
Non Patent Literature 2: https://sei.co.jp/technology/tr/bn179/pdf/sei10675.pdf, "Passive optical components supporting FTTH", Hiroo Kanamori

SUMMARY OF INVENTION

Technical Problem

However, since optical fibers are melted to manufacture the optical coupler illustrated in FIG. 4B, the two optical fibers are completely welded, and the two optical fibers cannot be separated again. Furthermore, thermal power exceeding 1000 degrees is required for melting the optical fibers, and thus the implementation at a construction site is feared from the viewpoint of safety. In addition, manufacturing a highly accurate optical coupler at a construction site is a challenge in terms of quality.

Therefore, an object of the present disclosure is to provide an optical coupling device capable of controlling a coupling rate of optical coupling between two coupling optical fibers.

Solution to Problem

In order to achieve the above object, an optical coupling device according to the present disclosure includes a thickness variable member between two optical fibers.

Specifically, an optical coupling device according to the present disclosure includes two coupling optical fibers each including a core and a clad and, between the two coupling optical fibers, a thickness variable member having a thickness between the two coupling optical fibers that varies by irradiation with light.

Specifically, an optical coupling system according to the present disclosure includes the optical coupling device of the present disclosure and a thickness controller that irradiates the thickness variable member with light through the irradiation optical fiber.

Advantageous Effects of Invention

According to the present disclosure, an optical coupling device capable of controlling the coupling degree of optical coupling between two coupling optical fibers can be provided. In addition, an optical coupling system using the optical coupling device can be provided.

BRIEF DESCRIPTION OF DRAWINGS

FIG. 7A is a diagram illustrating a specific configuration of the optical coupling device of the present disclosure.

DESCRIPTION OF EMBODIMENTS

Figure 1:
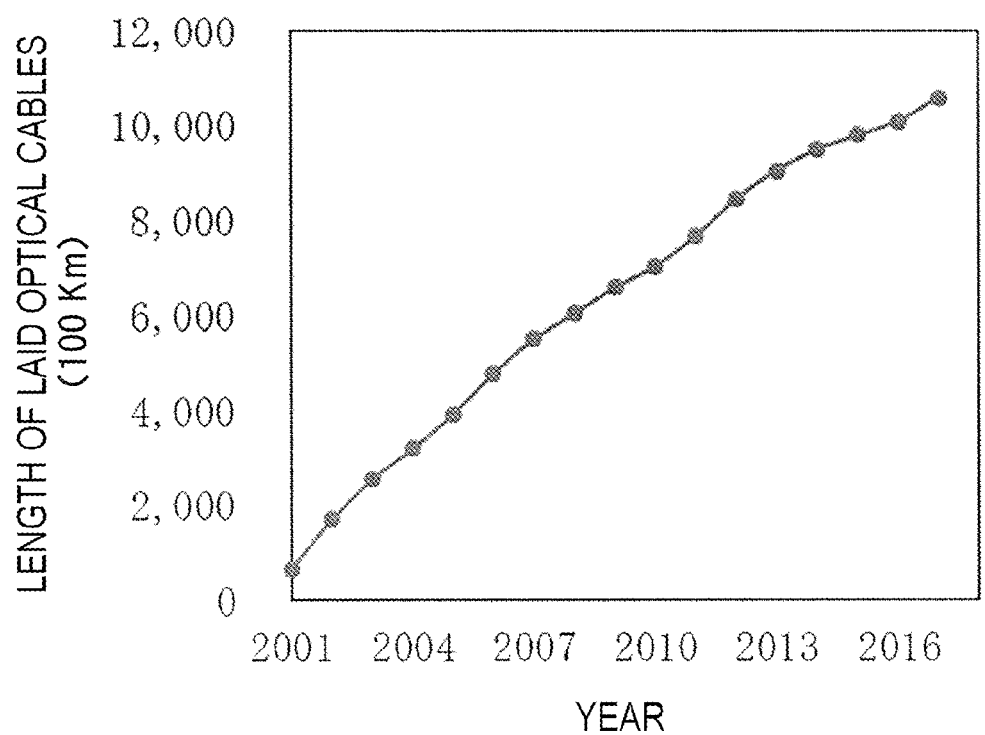
FIG. 1 is a diagram illustrating the amount of optical cables that have been laid.
Figure 2:
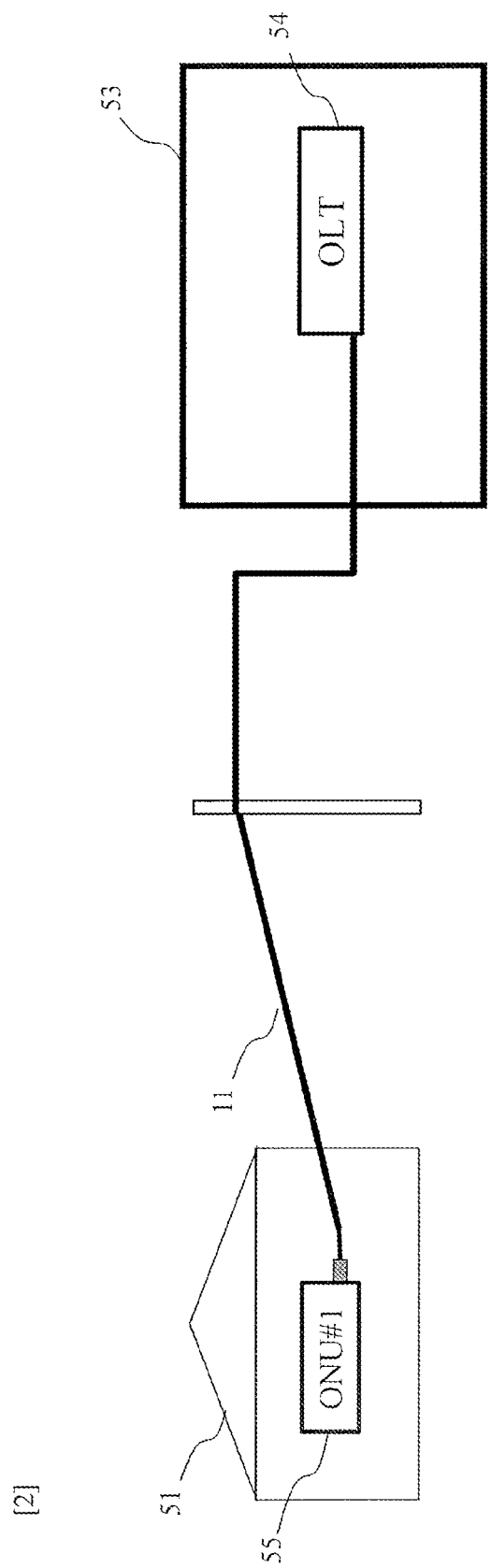
FIG. 2 is a diagram illustrating an example of an optical access system.
Figure 3:
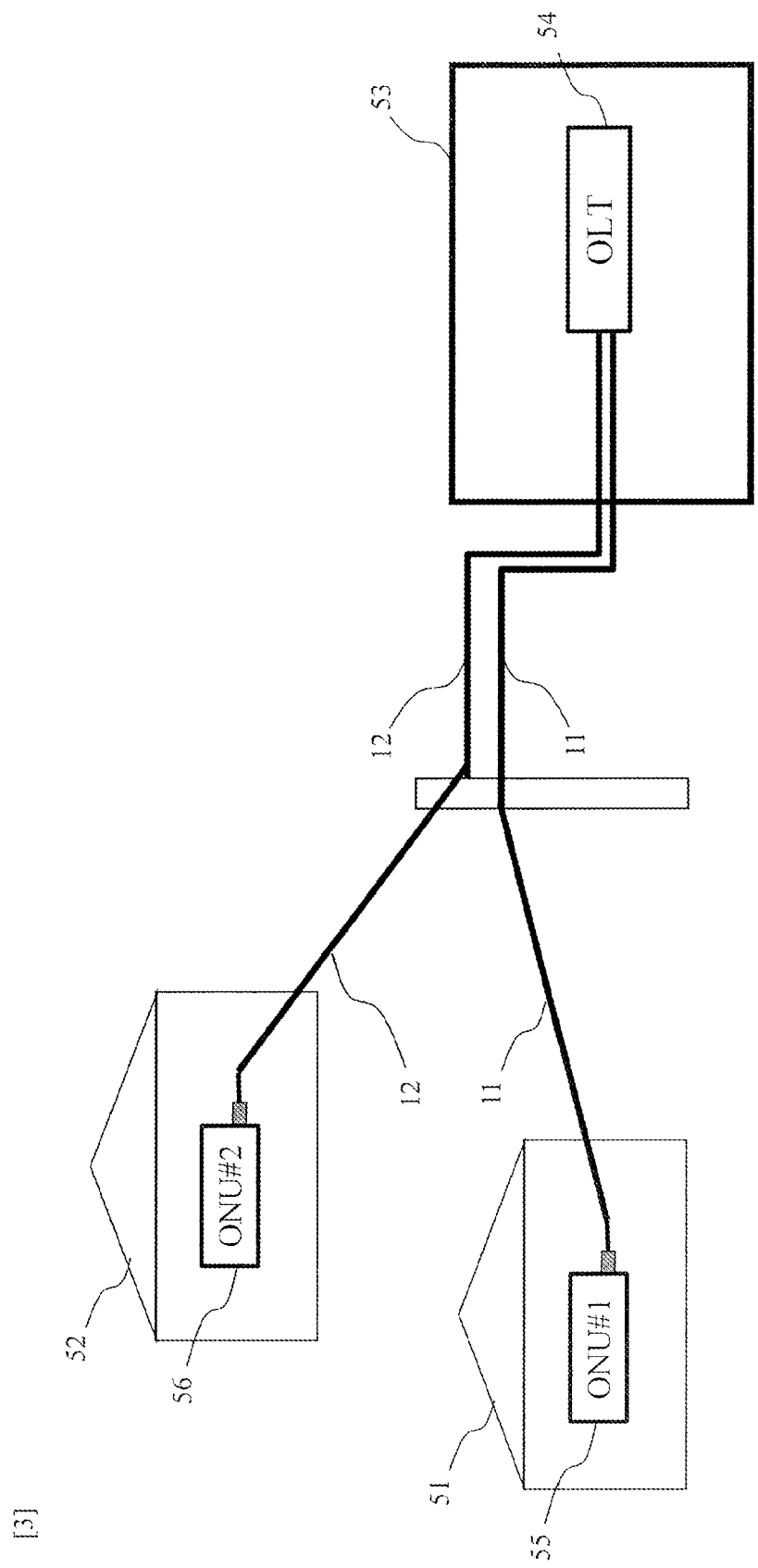
FIG. 3 is a diagram illustrating an example in which a new optical fiber is laid.
Figure 4A:
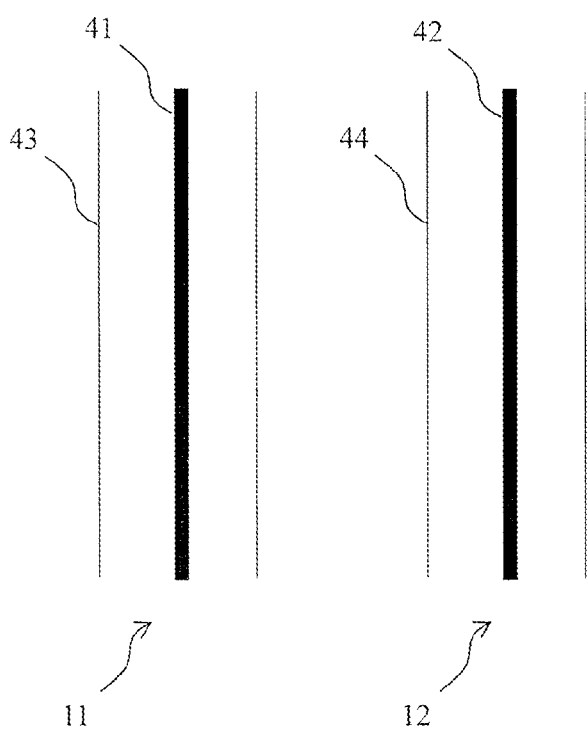
FIG. 4A is a diagram illustrating an example of an optical coupler including processed optical fibers.
Figure 4B:
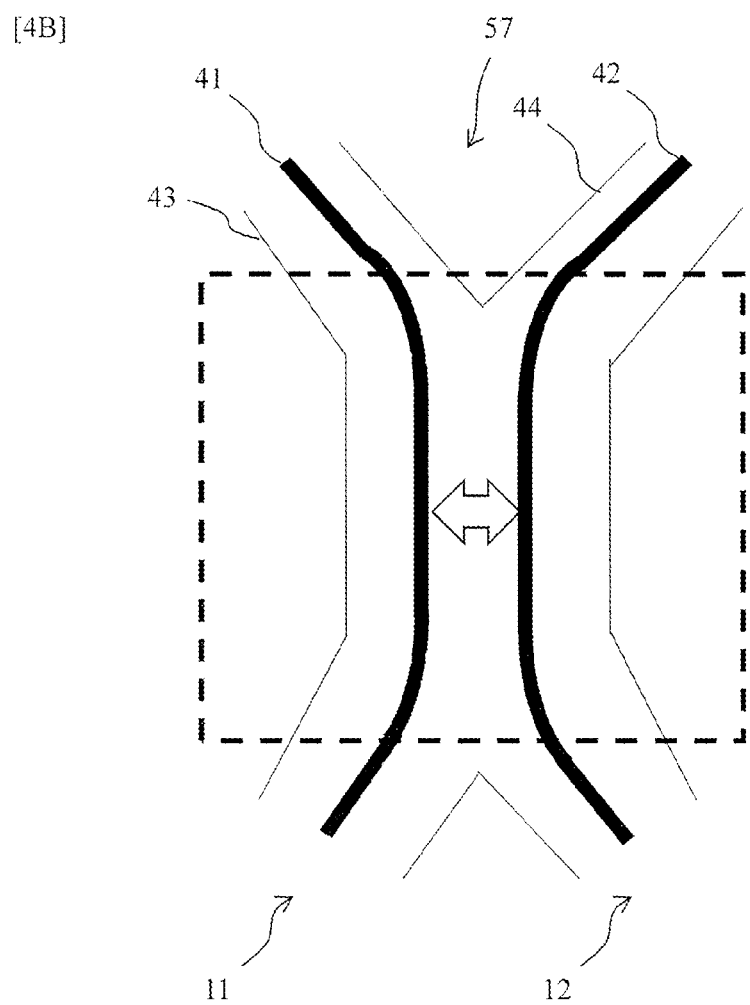
FIG. 4B is a diagram illustrating the example of the optical coupler including the processed optical fibers.
Figure 5:
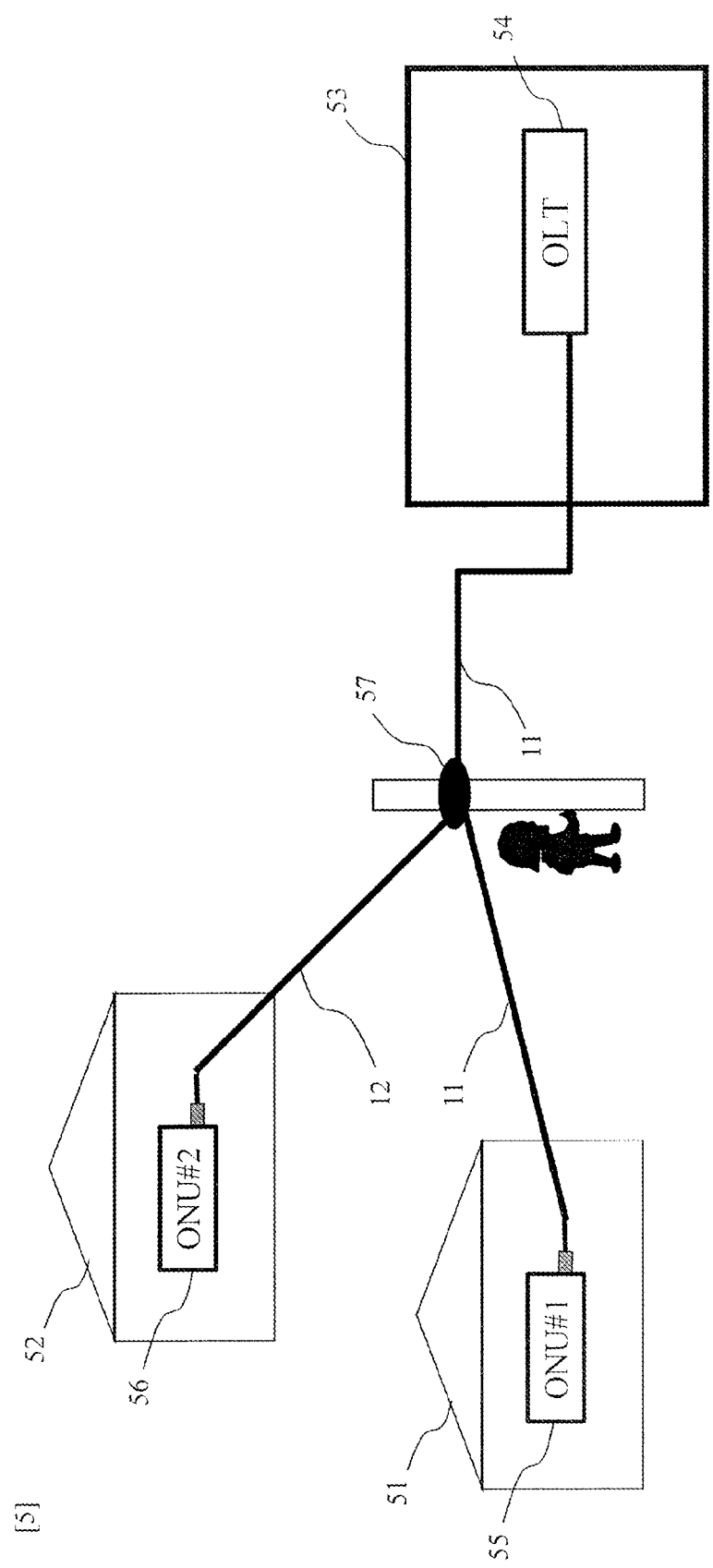
FIG. 5 is a diagram illustrating an example of an optical access system.

Embodiments of the present disclosure will be described in detail below with reference to the drawings. Note that the present disclosure is not limited to the following embodiments. These embodiments are merely examples, and the present disclosure can be carried out in a form with various modifications and improvements on the basis of the knowledge of those skilled in the art. Note that components having the same reference numerals in the present description and the drawings indicate the same numerals.

First Embodiment

Figure 6A:
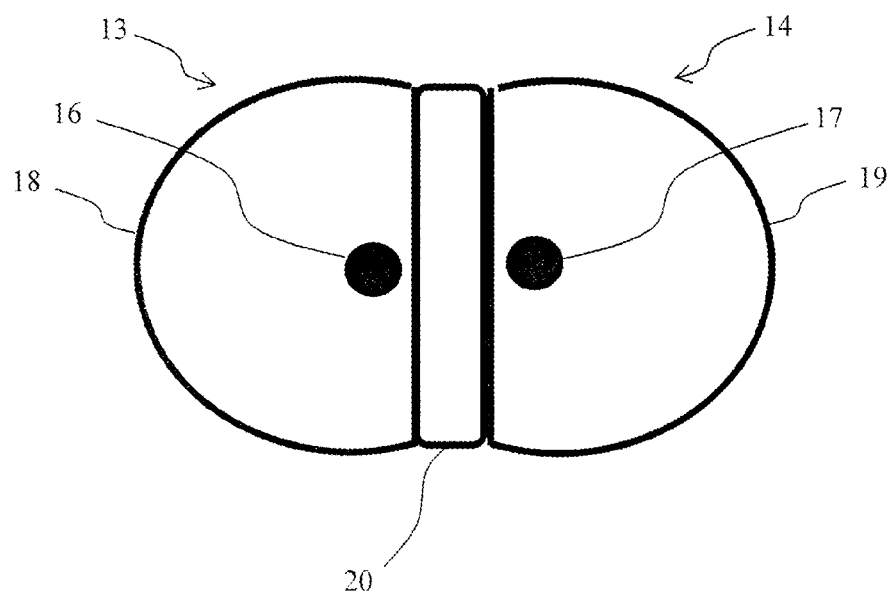
FIG. 6A is a diagram illustrating a specific configuration of an optical coupling device of the present disclosure.
Figure 6B:
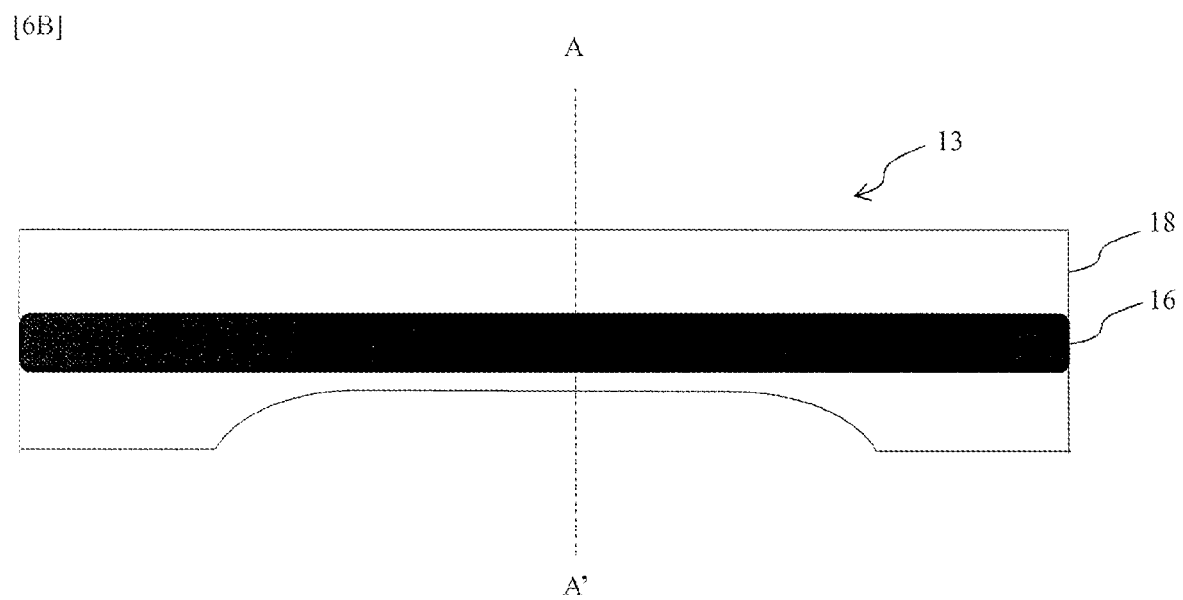
FIG. 6B is a diagram illustrating the specific configuration of the optical coupling device of the present disclosure.

A specific configuration of an optical coupling device of the present disclosure will be described with reference to FIGS. 6A and 6B. In FIGS. 6A and 6B, a reference numeral 13 denotes an optical fiber (#3), a reference numeral 14 denotes an optical fiber (#4), a reference numeral 16 denotes a core (#3), a reference numeral 17 denotes a core (#4), a reference numeral 18 denotes a clad (#3), a reference numeral 19 denotes a clad (#4), and a reference numeral 20 denotes a thickness variable member. FIG. 6B is a cross section of the optical fiber (#3) 13 in the long axis direction, and a cross section perpendicular to the long axis direction along line A-A' in FIG. 6B represents the optical fiber (#3) 13 in FIG. 6A.

In the coupling optical fiber (#3) 13 used in the optical coupling device of the present disclosure, as illustrated in FIGS. 6A and 6B, the surface of the clad (#3) 18 in a portion in contact with the thickness variable member 20 is preferably processed planarly. The same applies to the coupling optical fiber (#4) 14. As illustrated in FIG. 6A, the optical fiber (#3) 13 and the optical fiber (#4) 14 are also referred to as a D-type because the cross-sectional shapes thereof on planes perpendicular to the long axis direction are D-shapes. The planarly processed regions of the two optical fibers (#3) 13 and (#4) 14 processed into a D-type are arranged to face each other. The thickness variable member 20 having a thickness that varies by irradiation with light is arranged between these regions facing each other.

The processing into a D-type causes the distance between the core (#3) 16 and the core (#4) 17 to be closer, thus facilitating optical coupling. Furthermore, by the clad (#3) 18 and the clad (#4) 19 being planarly processed, the thickness variable member 20 can be stably sandwiched between the optical fiber (#3) 13 and the optical fiber (#4) 14.

In the optical coupling device of FIG. 6A, by the thickness variable member 20 being irradiated with light, the volume of the thickness variable member 20 varies, and as a result, the thickness of the thickness variable member 20 varies, and the coupling degree of optical coupling between the two coupling optical fibers (#3) 13 and (#4) 14 can be controlled. When the coupling degree of optical coupling is varied, a branching ratio from the optical fiber (#3) 13 to the optical fiber (#4) 14 or a branching ratio from the optical fiber (#4) 14 to the optical fiber (#3) 13 is varied.

Figure 7B:
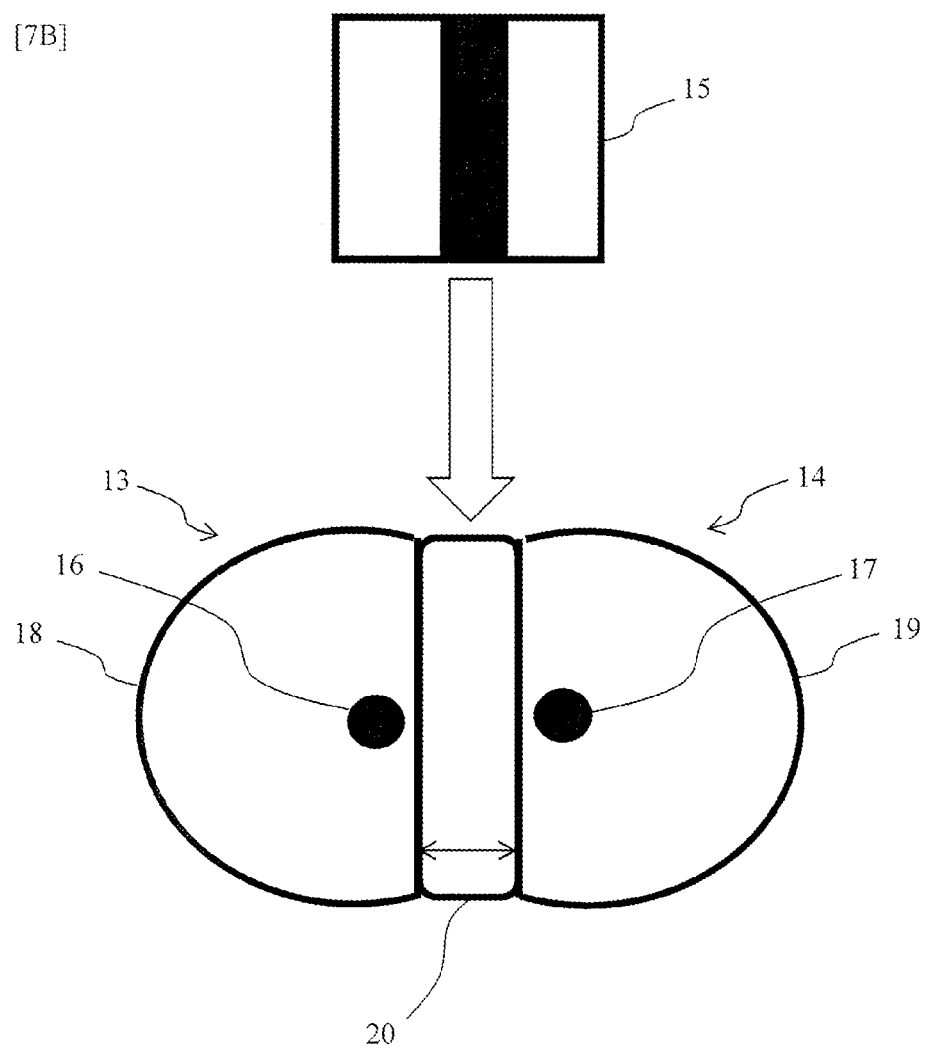
FIG. 7B is a diagram illustrating the specific configuration of the optical coupling device of the present disclosure.

The optical coupling device of the present disclosure preferably further includes an irradiation optical fiber that irradiates the thickness variable member with light. A specific configuration of the optical coupling device of the present disclosure will be described with reference to FIGS. 7A and 7B. A reference numeral 13 denotes the optical fiber (#3), a reference numeral 14 denotes the optical fiber (#4), a reference numeral 15 denotes an irradiation optical fiber (#5), a reference numeral 16 denotes the core (#3), a reference numeral 17 denotes the core (#4), a reference numeral 18 denotes the clad (#3), a reference numeral 19 denotes the clad (#4), and a reference numeral 20 denotes the thickness variable member. FIGS. 7A and 7B illustrate cross sections perpendicular to the long axis direction of the optical fiber (#3) 13 and the optical fiber (#4) 14.

In FIGS. 7A and 7B, the irradiation optical fiber (#5) 15 is arranged above the thickness variable member 20 in the drawings. This arrangement is merely an example, and the arrangement is not limited to be above as long as the thickness variable member 20 can be irradiated with irradiation light.

In FIG. 7A, since light is not emitted from the optical fiber (#5) 15, optical coupling occurs from the core (#3) 16 to the core (#4) 17. In FIG. 7B, since light is emitted from the optical fiber (#5) 15 and the thickness of the thickness variable member 20 increases, optical coupling does not occur from the core (#3) 16 to the core (#4) 17. Irradiating the thickness variable member 20 with light increases the thickness of the thickness variable member 20 to widen the interval between the core (#3) 16 and the core (#4) 17. Therefore, optical coupling does not occur from the core (#3) 16 to the core (#4) 17. Furthermore, optical coupling does not occur from the core (#4) 17 to the core (#3) 16.

Figure 8:
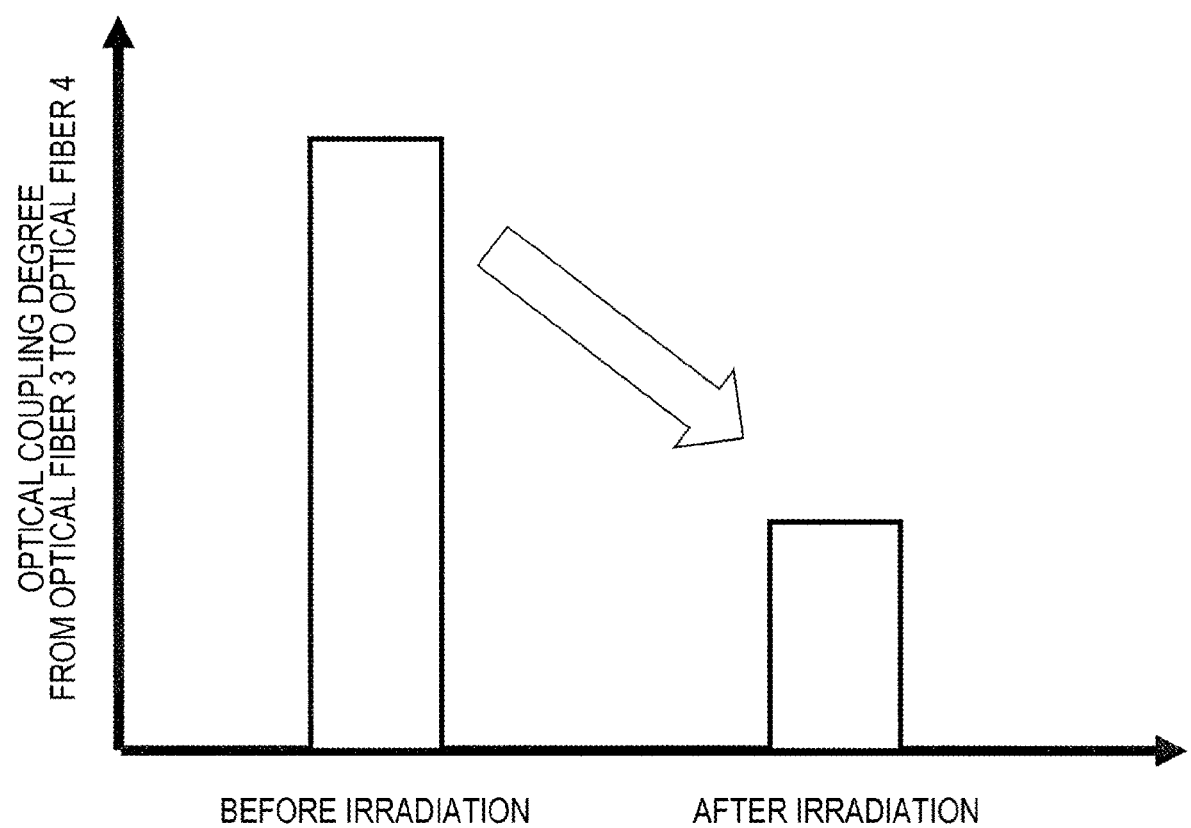
FIG. 8 is a diagram illustrating variation in optical coupling by the optical coupling device of the present disclosure.

FIG. 8 illustrates variation of optical coupling before and after irradiation of the thickness variable member 20 with light. In FIG. 8, the horizontal axis represents before and after irradiation of the thickness variable member 20 with light, and the vertical axis represents the coupling degree of optical coupling from the core (#3) 16 of the optical fiber (#3) 13 to the core (#4) 17 of the optical fiber (#4) 14. Irradiating the thickness variable member 20 with light increases the thickness of the thickness variable member 20 to widen the interval between the core (#3) 16 and the core (#4) 17, and thus the coupling degree of optical coupling from the core (#3) 16 to the core (#4) 17 decreases.

When the thickness of the thickness variable member 20 decreases by irradiation with light, a phenomenon opposite to that in FIG. 8 can be achieved. That is, when the thickness variable member 20 is irradiated with light after the coupling degree of optical coupling from the core (#3) 16 of the optical fiber (#3) 13 to the core (#4) 17 of the optical fiber (#4) 14 is set to be small in a state where the thickness variable member 20 is not irradiated with light, the thickness of the thickness variable member 20 decreases and the interval between the core (#3) 16 and the core (#4) 17 narrows, and thus the coupling degree of optical coupling from the core (#3) 16 to the core (#4) 17 can increase.

As described above, by the thickness of the thickness variable member 20 being varied, the coupling degree of optical coupling between the core (#3) 16 of the optical fiber (#3) 13 and the core (#4) 17 of the optical fiber (#4) 14 can be controlled. The variable amount of the thickness can be adjusted using intensity, a wavelength, and emitting time of irradiation light as parameters. In a case where the irradiation optical fiber that irradiates the thickness variable member 20 with light is further included, the thickness variable member can be irradiated with light without an active component being included in the optical coupling device. Furthermore, the irradiation optical fiber can concentrate irradiation light on the thickness variable member 20.

Second Embodiment

Figure 9:
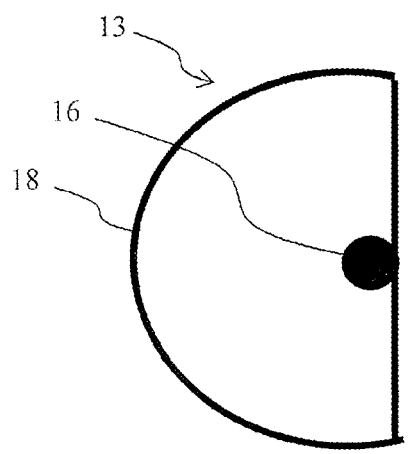
FIG. 9 is a diagram illustrating a specific configuration of an optical coupling device of the present disclosure.
Figure 10:
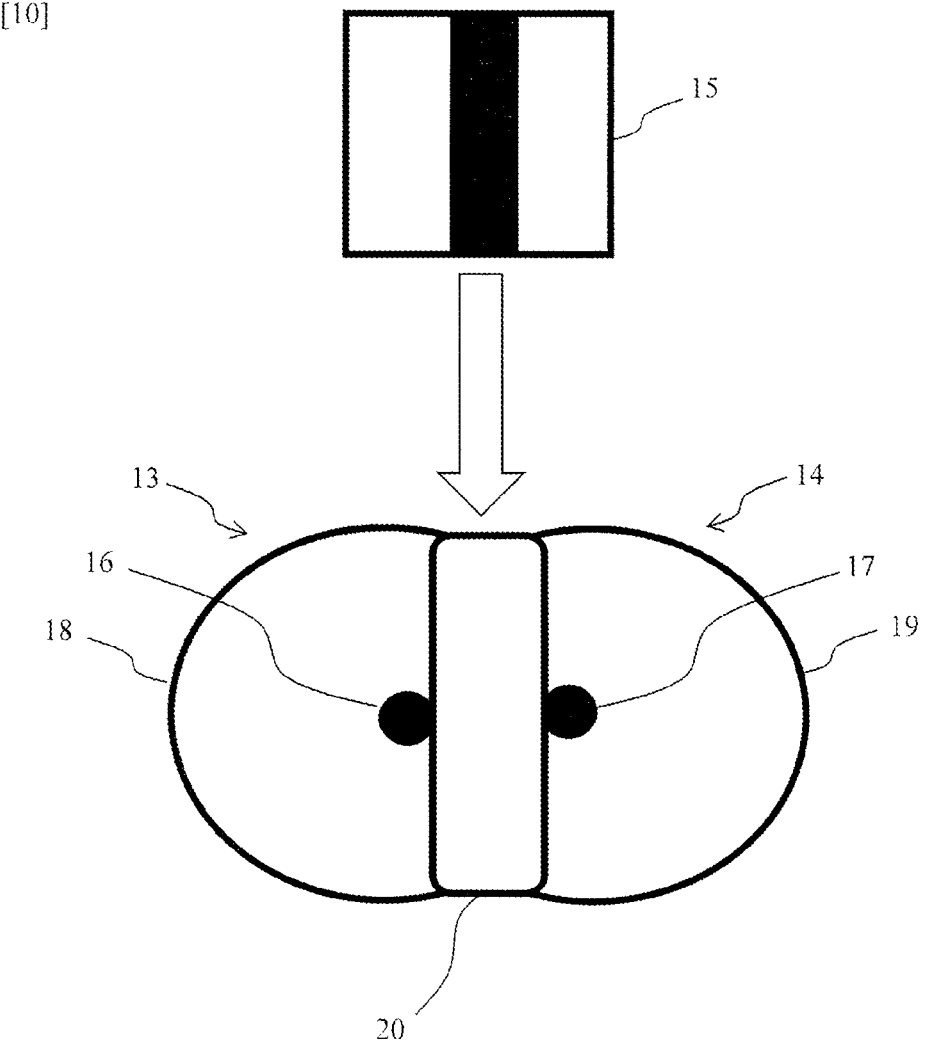
FIG. 10 is a diagram illustrating the specific configuration of the optical coupling device of the present disclosure.
Figure 11:
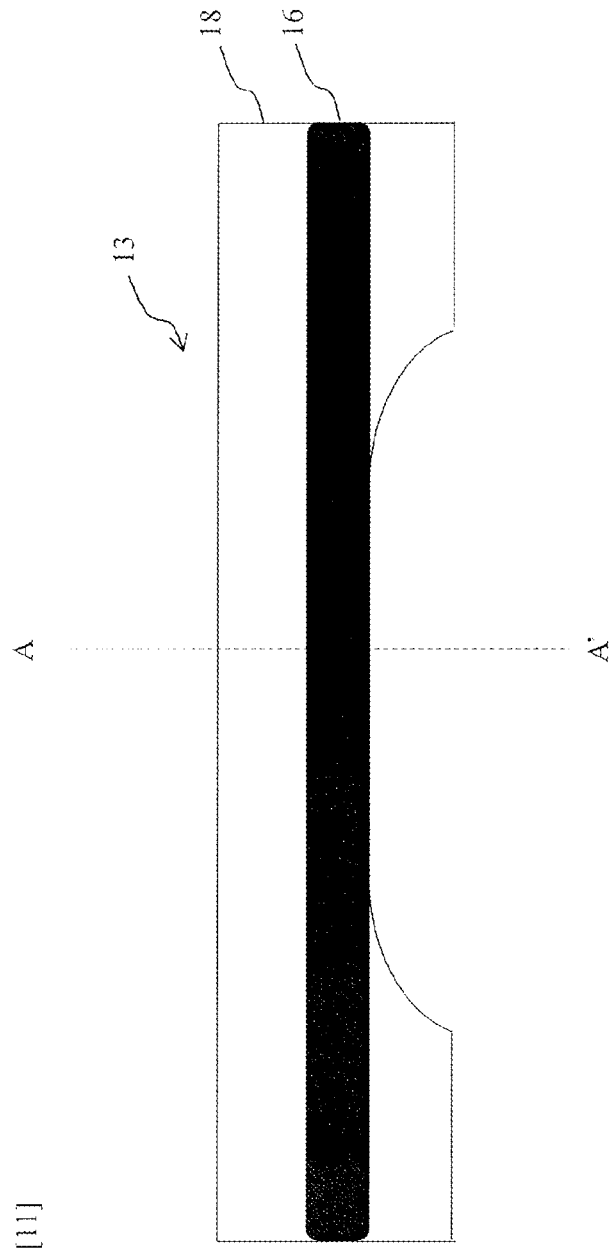
FIG. 11 is a diagram illustrating the specific configuration of the optical coupling device of the present disclosure.

In two coupling optical fibers of an optical coupling device of the present disclosure, the surfaces of clads in portions in contact with a thickness variable member are processed planarly such that cores are exposed. A specific configuration of the optical coupling device of the present disclosure will be described with reference to FIGS. 9, 10, and 11. In FIGS. 9, 10, and 11, a reference numeral 13 denotes an optical fiber (#3), a reference numeral 14 denotes an optical fiber (#4), a reference numeral 15 denotes an irradiation optical fiber (#5), a reference numeral 16 denotes a core (#3), a reference numeral 17 denotes a core (#4), a reference numeral 18 denotes a clad (#3), a reference numeral 19 denotes a clad (#4), and a reference numeral 20 denotes a thickness variable member. FIG. 9 illustrates a cross section perpendicular to the long axis direction of the optical fiber (#3) 13. FIG. 10 illustrates cross sections perpendicular to the long axis direction of the optical fiber (#3) 13 and the optical fiber (#4) 14. FIG. 11 is a cross section of the optical fiber (#3) 13 in the long axis direction, and a cross section perpendicular to the long axis direction along line A-A' in FIG. 11 represents the optical fiber (#3) 13 in FIG. 9.

In FIG. 10, the irradiation optical fiber (#5) 15 is arranged above the thickness variable member 20 in the drawing. This arrangement is merely an example, and the arrangement is not limited to be above as long as the thickness variable member 20 can be irradiated with irradiation light.

In the coupling optical fiber (#3) 13 used for the optical coupling device of the present disclosure, as illustrated in FIGS. 9 to 11, the surface of the clad (#3) 18 in a portion in contact with the thickness variable member 20 is processed planarly such that the core (#3) 16 is exposed from the clad. The same applies to the coupling optical fiber (#4) 14. The distance between the core (#3) 16 and the core (#4) 17 gets closer and thus optical coupling is facilitated. As illustrated in FIG. 10, both the optical fiber (#3) 13 and the optical fiber (#4) 14 have cross-sectional shapes on planes perpendicular to the long axis direction that are D-shapes similarly to the above embodiment. The planarly processed regions of the two optical fibers (#3) 13 and (#4) 14 processed into a D-type are arranged to face each other. The thickness variable member 20 having a thickness that varies by irradiation with light is arranged between these regions facing each other.

The processing into a D-type causes the distance between the core (#3) 16 and the core (#4) 17 to be closer, thus facilitating optical coupling. By the clad (#3) 18 and the clad (#4) 19 being processed planarly such that the cores are exposed, optical coupling between the core (#3) 16 and the core (#4) 17 gets denser. Furthermore, the processing into a D-type allows the thickness variable member 20 to be stably sandwiched between the optical fiber (#3) 13 and the optical fiber (#4) 14.

In the optical coupling device of FIG. 10, by the thickness variable member 20 being irradiated with light, the thickness of the thickness variable member 20 varies, and optical coupling between the two coupling optical fibers (#3) 13 and (#4) 14 can be controlled.

In FIG. 10, the irradiation optical fiber (#5) 15 is arranged above the thickness variable member 20 in the drawing. This arrangement is merely an example, and the arrangement is not limited to be above as long as the thickness variable member 20 can be irradiated with irradiation light.

As described above, in the two coupling optical fibers according to the optical coupling device of the present disclosure, the surfaces of the clads in the portions in contact with the thickness variable member are processed planarly such that cores are exposed, and thus optical coupling between the cores can be facilitated. Furthermore, since the irradiation optical fiber that irradiates the thickness variable member 20 with light is further included, the thickness variable member can be irradiated with light without an active component being included in the optical coupling device. Furthermore, the irradiation optical fiber can concentrate irradiation light on the thickness variable member 20.

Third Embodiment

Figure 12:
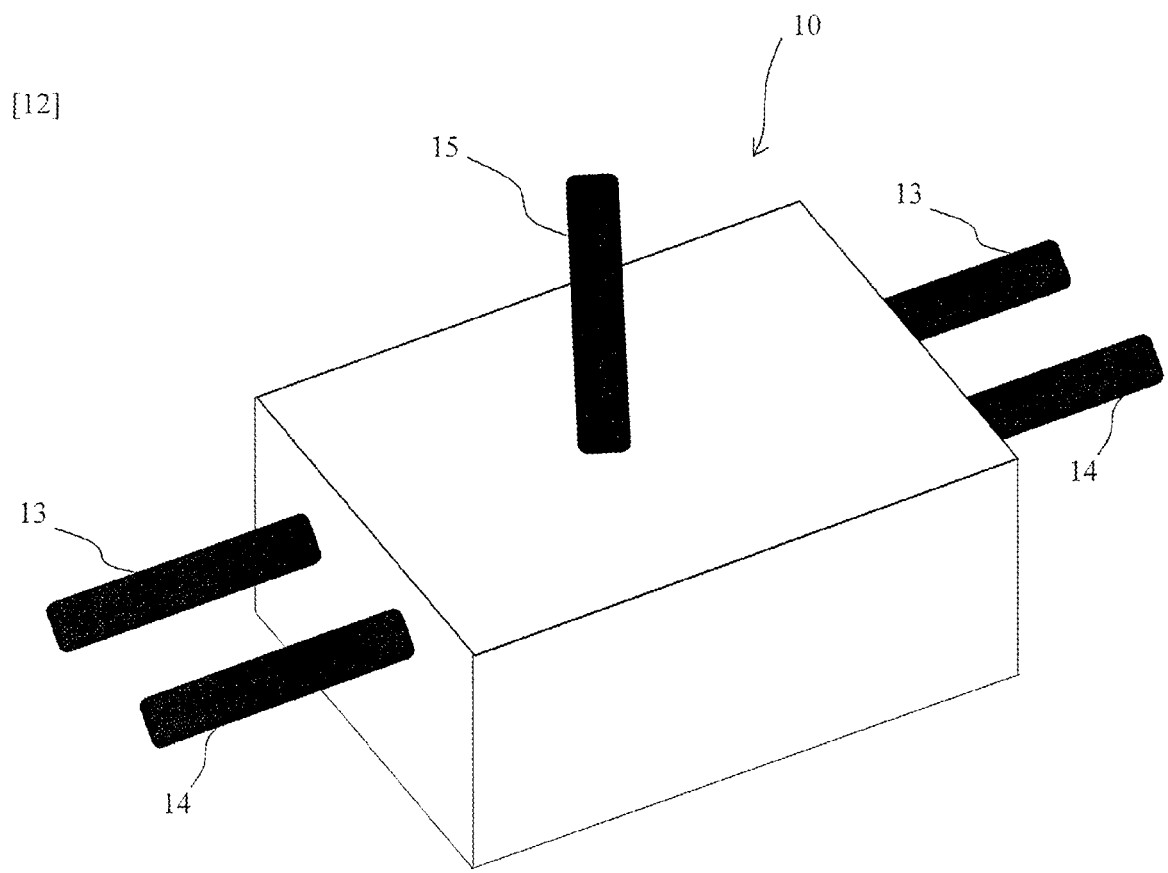
FIG. 12 is a diagram illustrating an external appearance example of an optical coupling device of the present disclosure.

FIG. 12 illustrates an external appearance example of an optical coupling device of the present disclosure. In FIG. 12, a reference numeral 10 denotes an optical coupling device, a reference numeral 13 denotes an optical fiber (#3), a reference numeral 14 denotes an optical fiber (#4), and a reference numeral 15 denotes an irradiation optical fiber (#5).

As illustrated in FIG. 12, in the optical coupling device 10, a coupling portion is preferably housed in a housing. This is for protecting the coupling portion. The optical fiber (#3) 13 and the optical fiber (#4) 14 are taken out from the housing. In addition, the irradiation optical fiber (#5) is also taken out.

Fourth Embodiment

Figure 13:
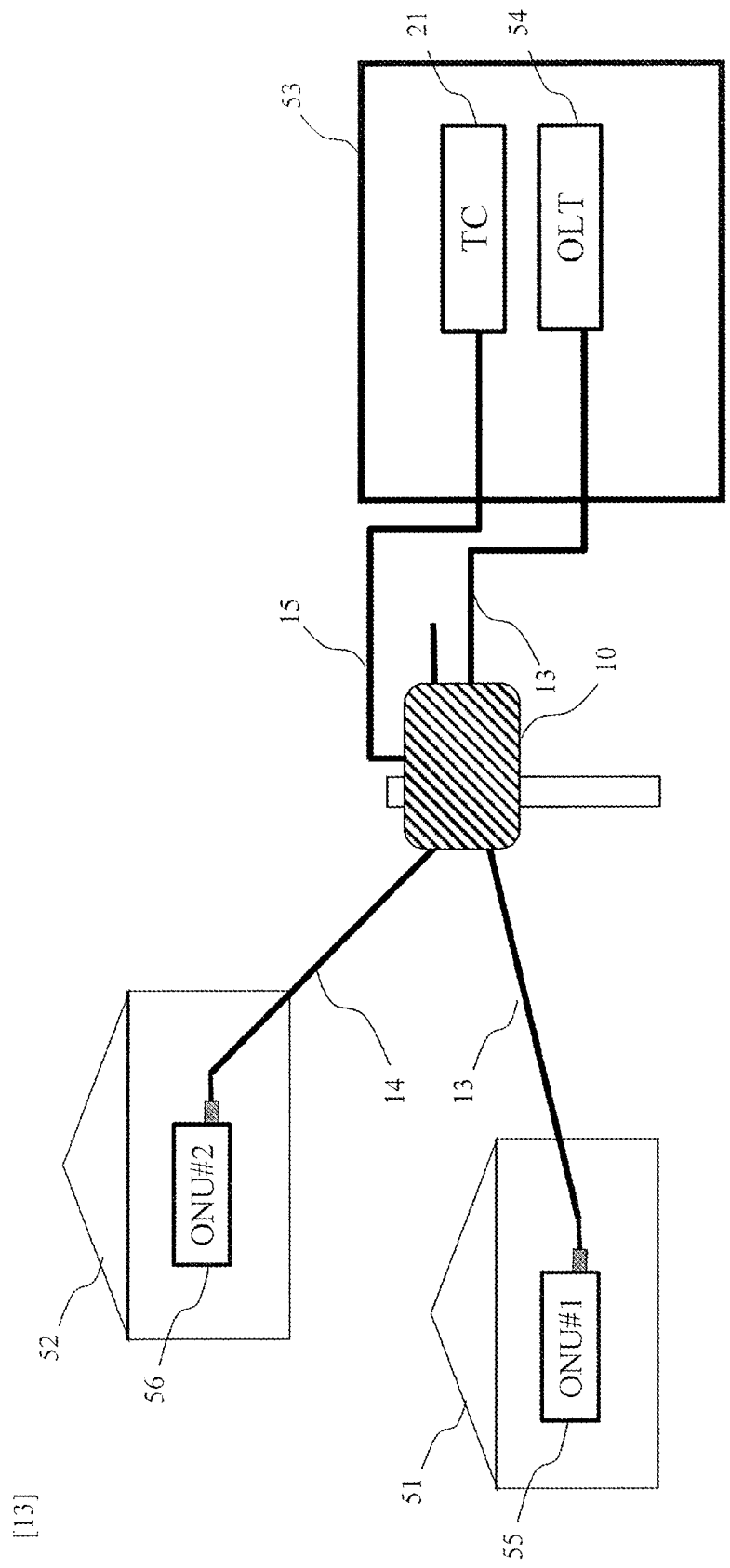
FIG. 13 is a diagram illustrating an optical coupling system configuration of the present disclosure.

FIG. 13 illustrates a configuration of an optical coupling system of the present disclosure. In FIG. 13, a reference numeral 10 denotes an optical coupling device, a reference numeral 13 denotes an optical fiber (#3), a reference numeral 14 denotes an optical fiber (#4), a reference numeral 15 denotes an optical fiber (#5), a reference numeral 21 denotes a thickness controller (TC), a reference numeral 51 denotes a user's home (#1), a reference numeral 52 denotes a user's home (#2), a reference numeral 53 denotes a communication building, a reference numeral 54 denotes an OLT, a reference numeral 55 denotes an ONU (#1), and a reference numeral 56 denotes an ONU (#2).

The OLT 54, the ONU (#1) 55, and the ONU (#2) 56 are connected via the optical coupling device 10. The thickness controller 21 installed in the communication building 53 transmits light to the optical coupling device 10 through the irradiation optical fiber (#5) 15. In the optical coupling device 10, the thickness variable member (not illustrated) is irradiated with light from the optical fiber (#5) 15, and the coupling degree of optical coupling between two optical fibers is controlled depending on intensity, a wavelength, and emitting time of the light. In FIG. 13, the thickness controller 21 is installed in the communication building 53, but the installation location is not limited to the inside of the communication building 53.

As described above, according to the optical coupling system of the present disclosure, the coupling degree of optical coupling by the optical coupling device 10 can be controlled by light from the thickness controller 21 installed in the communication building being transmitted or cut.

Fifth Embodiment

Figure 14:
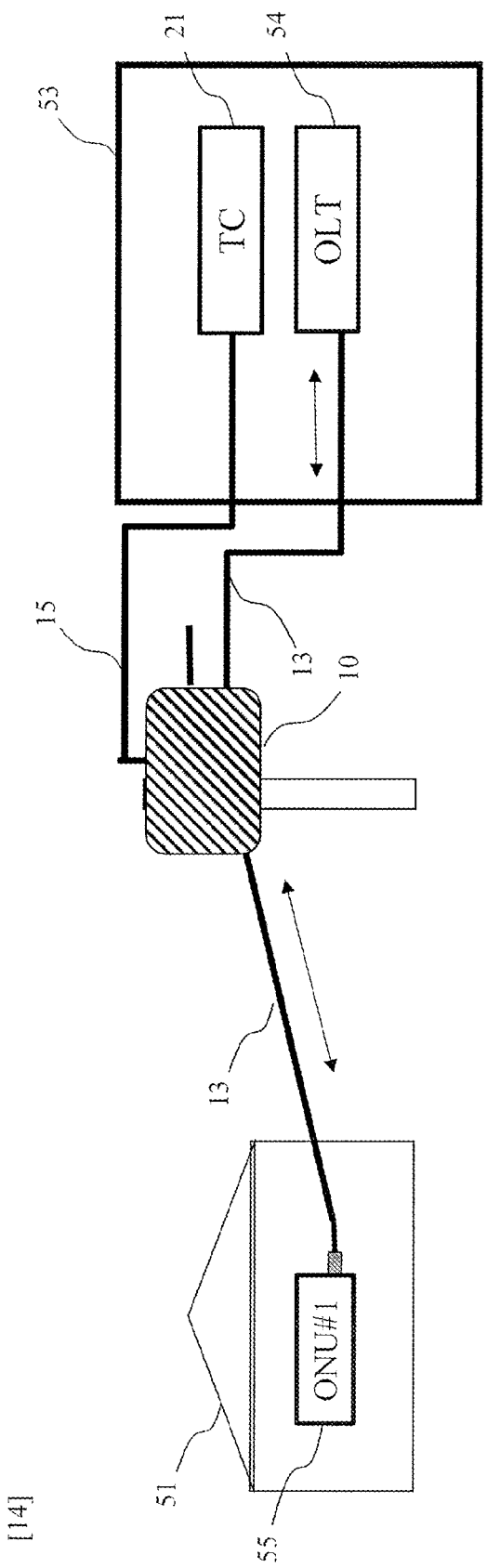
FIG. 14 is a diagram illustrating an optical coupling system of the present disclosure.
Figure 15:
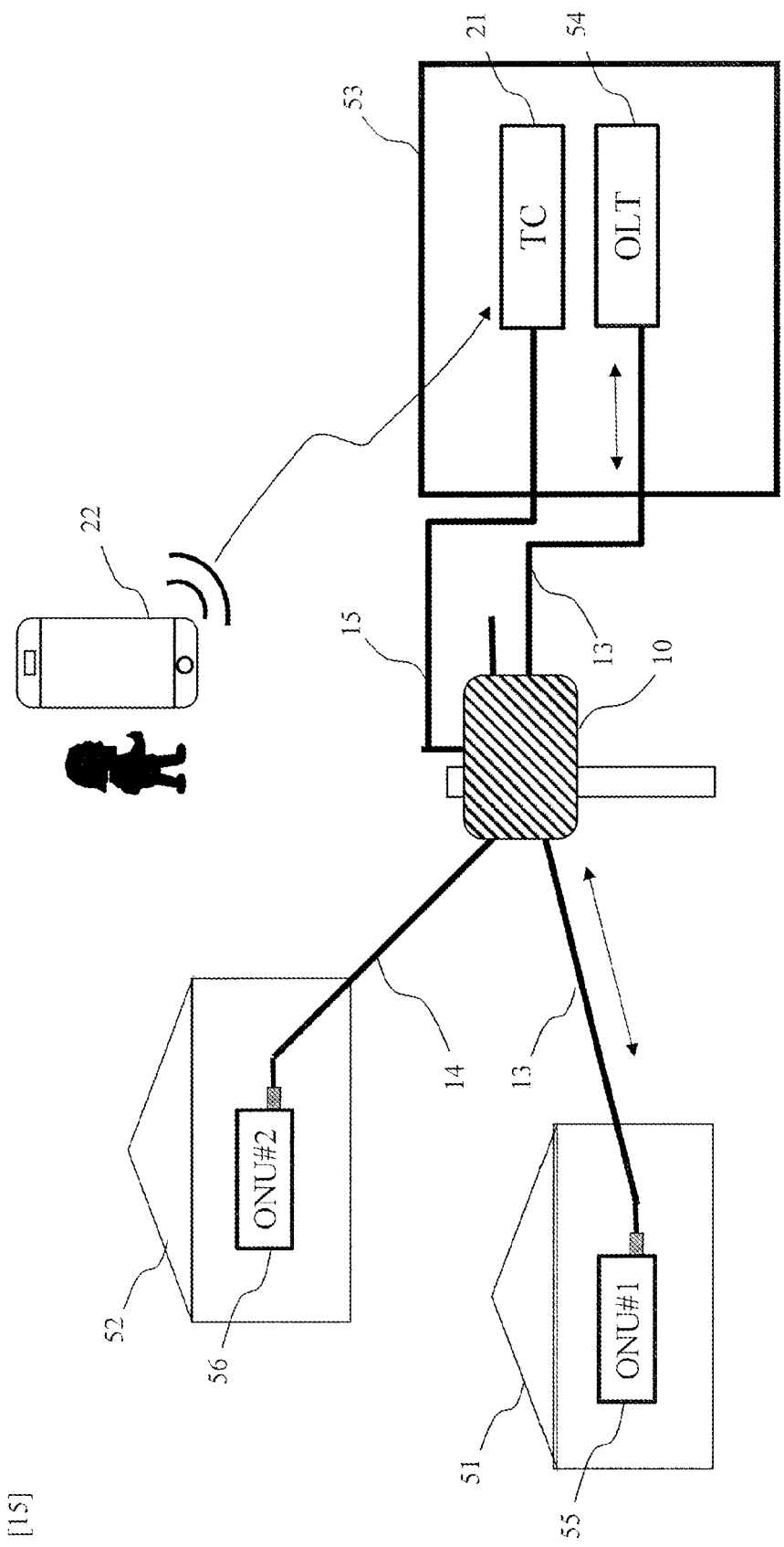
FIG. 15 is a diagram illustrating the optical coupling system of the present disclosure.
Figure 16:
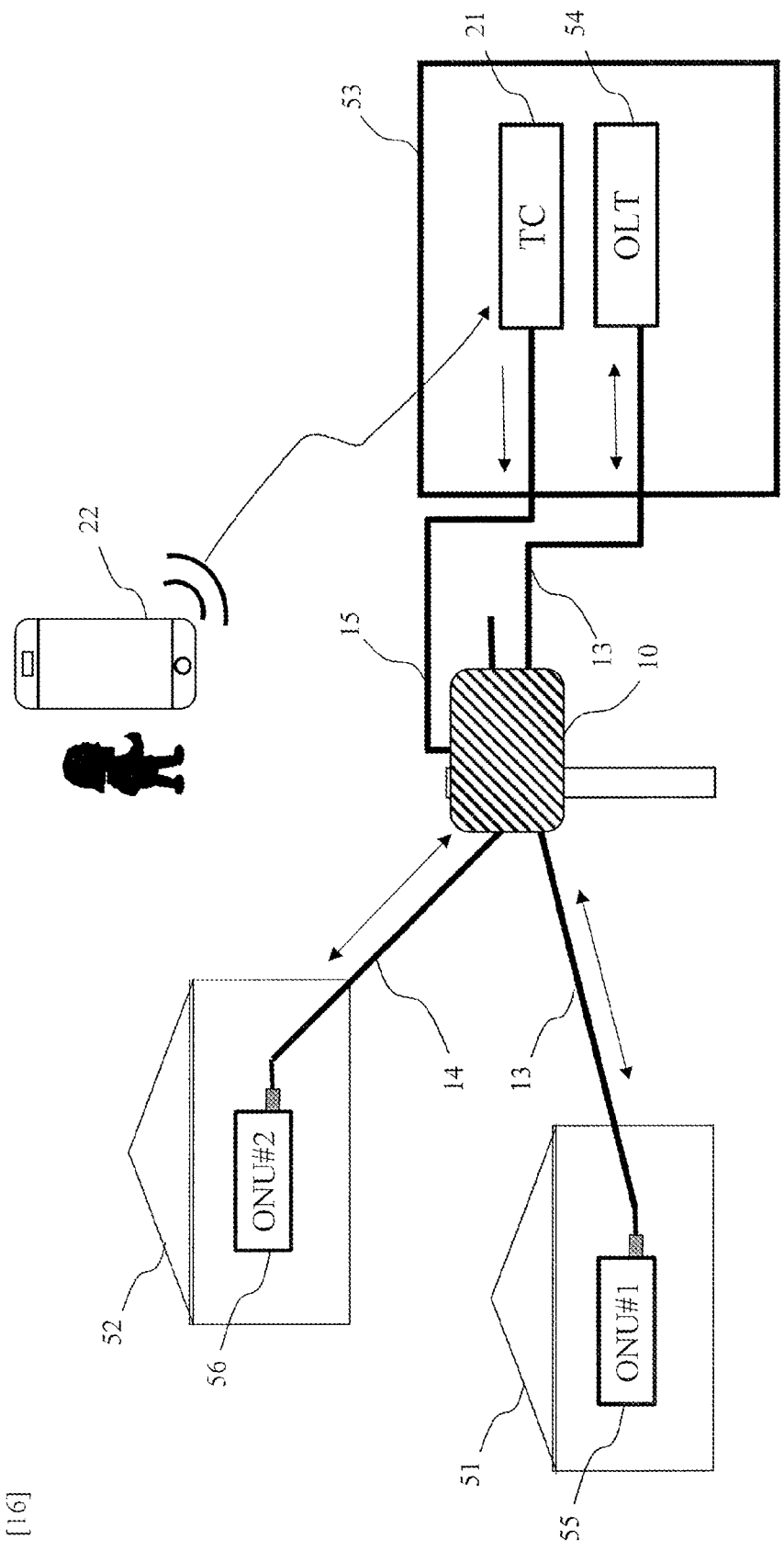
FIG. 16 is a diagram illustrating the optical coupling system of the present disclosure.

A procedure using an optical coupling system of the present disclosure in a case where a new user desires a service using an optical fiber will be described with reference to FIGS. 14, 15, and 16. In FIGS. 14, 15, and 16, a reference numeral 10 denotes an optical coupling device, a reference numeral 13 denotes an optical fiber (#3), a reference numeral 14 denotes an optical fiber (#4), a reference numeral 15 denotes an optical fiber (#5), a reference numeral 21 denotes a thickness controller (TC), a reference numeral 22 denotes a mobile terminal, a reference numeral 51 denotes a user's home (#1), a reference numeral 52 denotes a user's home (#2), a reference numeral 53 denotes a communication building, a reference numeral 54 denotes an OLT, a reference numeral 55 denotes an ONU (#1), and a reference numeral 56 denotes an ONU (#2).

As illustrated in FIG. 14, for an existing user, the OLT 54 and the ONU (#1) 55 are connected via the optical coupling device 10. In a case where a new user desires a service using an optical fiber, as illustrated in FIG. 15, the ONU (#2) 56 is installed in the user's home (#2), the optical fiber (#4) 14 is laid between the ONU (#2) 56 and the optical coupling device 10, and the optical fiber (#4) 14 is connected to the ONU (#2) 56 and the optical coupling device 10. The mobile terminal 22 instructs the thickness controller 21 to emit or cut irradiation light. As illustrated in FIG. 16, the thickness controller 21 transmits or cuts irradiation light to or from the optical coupling device 10 through the irradiation optical fiber (#5) 15. Emitting or cutting irradiation light to or from the thickness variable member (not illustrated) causes the optical coupling device 10 to perform optical coupling between the two optical fibers, and communication opens between the OLT 54 and the ONU (#2) 56.

FIGS. 15 and 16 illustrate an example in which irradiating the thickness variable member (not illustrated) with irradiation light causes the optical coupling device 10 to perform optical coupling between the two optical fibers. In a case where cutting irradiation light from the thickness variable member (not illustrated) causes optical coupling between the two optical fibers, the thickness controller 21 cuts irradiation light according to an instruction from the mobile terminal 22.

In a case of performing cutting construction for the ONU (#2) 56, the procedure illustrated in FIGS. 14, 15, and 16 is reversed. Even in this case, the optical coupling by the optical coupling device 10 can be controlled from the thickness controller 21.

As described above, according to the optical coupling system of the present disclosure, since optical coupling by the optical coupling device 10 can be controlled by the thickness controller 21 installed in the communication building 53, shortening of the period of opening construction and cutting construction, reduction of workers, improvement of safety, and the like can be expected. In addition, since emitting or cutting of irradiation light can be instructed from the mobile terminal 22 to the thickness controller 21, further shortening of the period of opening construction and cutting construction, reduction of workers, improvement of safety, and the like can be expected.

Sixth Embodiment

Figure 17:
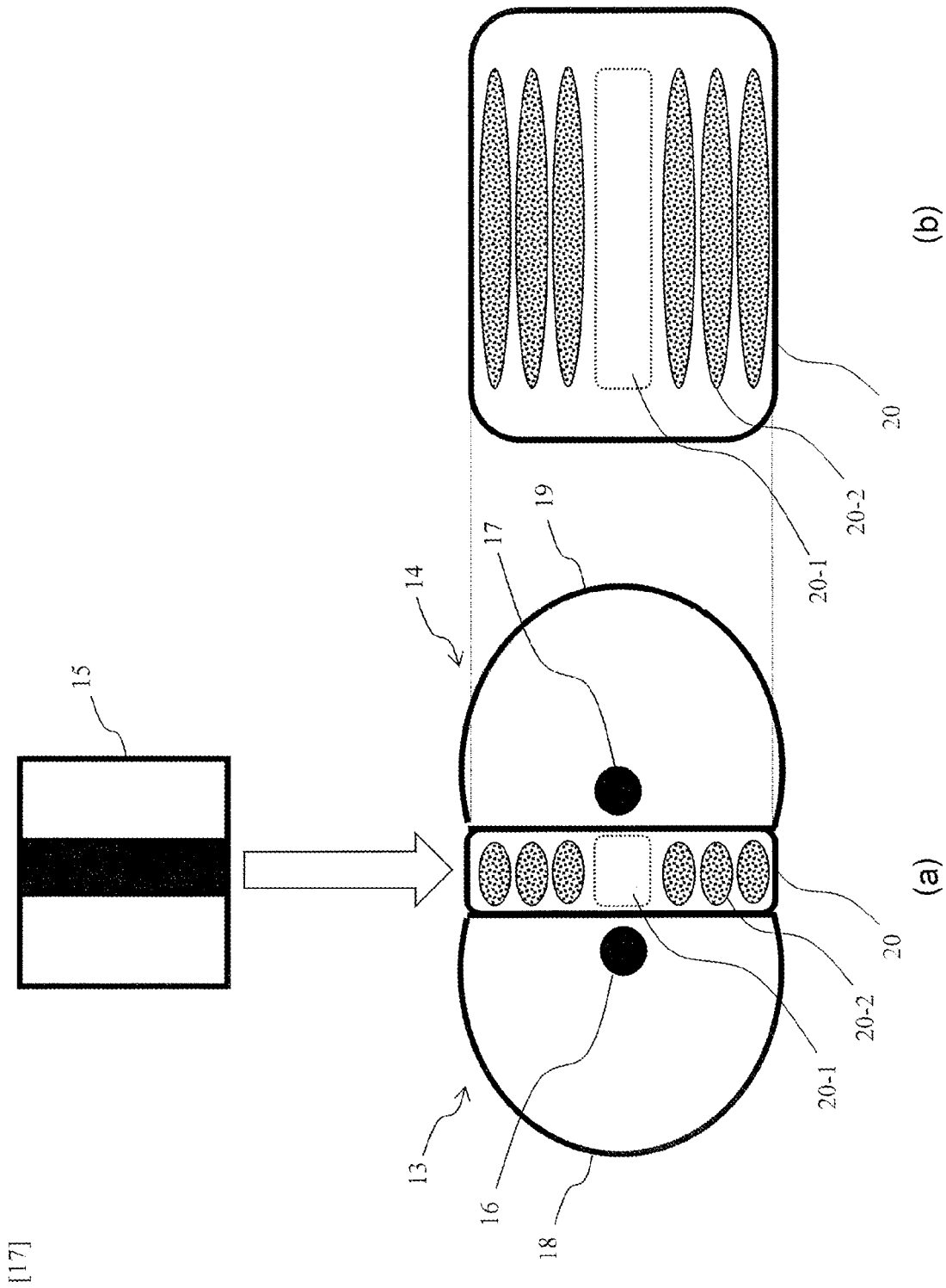
FIG. 17 is a diagram illustrating a configuration of an optical coupling device of the present disclosure.

A thickness variable member utilized for an optical coupling device will be described. FIG. 17 illustrates a configuration of the optical coupling device of the present disclosure. In FIG. 17, a reference numeral 13 denotes an optical fiber (#3), a reference numeral 14 denotes an optical fiber (#4), a reference numeral 15 denotes an irradiation optical fiber (#5), a reference numeral 16 denotes a core (#3), a reference numeral 17 denotes a core (#4), a reference numeral 18 denotes a clad (#3), a reference numeral 19 denotes a clad (#4), a reference numeral 20 denotes a thickness variable member, a reference numeral 20-1 denotes a region including no material having a volume that varies by irradiation with light, and a reference numeral 20-2 denotes a region into which a material having a volume that varies by irradiation with light is kneaded. FIG. 17 illustrates a cross section perpendicular to the long axis direction of the optical fiber (#3) 13.

The material of the thickness variable member 20 is a material having a volume that varies by irradiation with light. The thickness of the thickness variable member 20 increases or decreases according to the increase or decrease in the volume of the material. The thickness of the thickness variable member 20 varies depending on a wavelength, intensity, and emitting time of irradiation light according to the characteristics of the material of the thickness variable member 20. Examples of a material capable of varying the volume include a glass material in which a polymer and a black substance are kneaded into glass. Examples of a black substance include carbon powder. Carbon powder receives light and converts it into heat. A polymer undergoes thermal swelling by heat. A region between the core (#3) 16 and the core (#4) 17 is preferably excluded from the region into which a polymer and a black substance are kneaded. This is for optical coupling between the core (#3) 16 and the core (#4) 17. In FIG. 17, the region 20-2 into which a material having a volume that varies by irradiation with light is kneaded is a glass region into which a polymer and a black substance are kneaded, and the region 20-1 including no material having a volume that varies by irradiation with light is a region in which a polymer and a black substance are not kneaded into glass. Irradiating such a thickness variable member 20 with light from the outside, for example, the irradiation optical fiber (#5) 15 causes swelling of the glass into which a polymer and a black substance are kneaded, and the thickness of the thickness variable member 20 increases. By the thickness of the thickness variable member 20 being increased, the coupling degree of optical coupling between the core (#3) 16 and the core (#4) 17 decreases.

Seventh Embodiment

Figure 18:
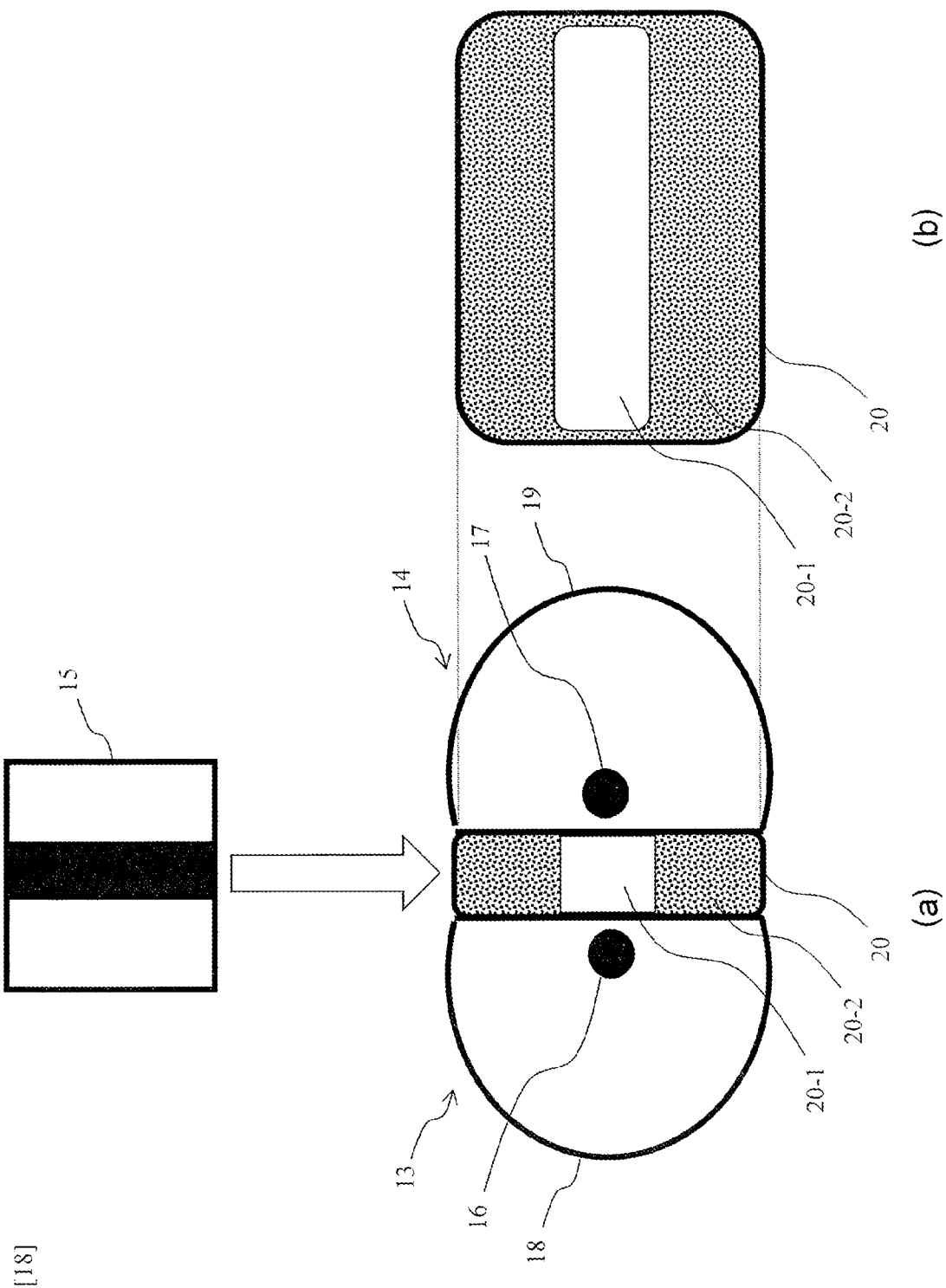
FIG. 18 is a diagram illustrating a configuration of an optical coupling device of the present disclosure.

Another thickness variable member utilized for an optical coupling device will be described. FIG. 18 illustrates a configuration of the optical coupling device of the present disclosure. In FIG. 18, a reference numeral 13 denotes an optical fiber (#3), a reference numeral 14 denotes an optical fiber (#4), a reference numeral 15 denotes an irradiation optical fiber (#5), a reference numeral 16 denotes a core (#3), a reference numeral 17 denotes a core (#4), a reference numeral 18 denotes a clad (#3), a reference numeral 19 denotes a clad (#4), a reference numeral 20 denotes a thickness variable member, a reference numeral 20-1 denotes a region including no material having a volume that varies by irradiation with light, and a reference numeral 20-2 denotes a region into which a material having a volume that varies by irradiation with light is kneaded. FIG. 18 illustrates a cross section perpendicular to the long axis direction of the optical fiber (#3) 13.

The material of the thickness variable member 20 is a material having a volume that varies by irradiation with light. The thickness of the thickness variable member 20 increases or decreases according to the increase or decrease in the volume of the material. The thickness of the thickness variable member 20 varies depending on a wavelength, intensity, and emitting time of irradiation light according to the characteristics of the material of the thickness variable member 20. Examples of a material capable of varying the volume include a glass material in which titanium oxide is kneaded into glass. In the glass into which titanium oxide is kneaded, the titanium oxide is mixed as crystalline particles. The crystalline particles have a sufficient size capable of reacting with light. A region between the core (#3) 16 and the core (#4) 17 is preferably excluded from the region into which titanium oxide is kneaded. This is for optical coupling between the core (#3) 16 and the core (#4) 17. In FIG. 18, the region 20-2 into which a material having a volume that varies by irradiation with light is kneaded is a glass region into which titanium oxide is kneaded, and the region 20-1 including no material having a volume that varies by irradiation with light is a region in which titanium oxide is not kneaded into glass. Irradiating such a thickness variable member 20 with light from the outside, for example, the irradiation optical fiber (#5) 15 causes contraction of the glass into which titanium oxide is kneaded, and the thickness of the thickness variable member 20 decreases. By the thickness of the thickness variable member 20 being decreased, the coupling degree of optical coupling between the core (#3) 16 and the core (#4) 17 increases.

INDUSTRIAL APPLICABILITY

The present disclosure can be applied to information communication industry.

REFERENCE SIGNS LIST

10 Optical coupling device
11 Optical fiber (#1)
12 Optical fiber (#2)
13 Optical fiber (#3)
14 Optical fiber (#4)
15 Optical fiber (#5)
16 Core (#3)
17 Core (#4)
18 Clad (#3)
19 Clad (#4)
20 Thickness variable member
20-1 Region including no material having a volume that varies by irradiation with light
20-2 Region into which a material having a volume that varies by irradiation with light is kneaded
21 Thickness controller
22 Mobile terminal
41 Core (#1)
42 Core (#2)
43 Clad (#1)
44 Clad (#2)
51 User's home (#1)
52 User's home (#2)
53 Communication building 54 OLT
55 ONU (#1)
56 ONU (#2)
57 Optical coupler

The invention claimed is:

1. An optical coupling device comprising:
two coupling optical fibers each comprising a core and a clad, wherein each clad of the two coupling optical fibers comprises a planar surface and each planar surface is disposed to face one another; and
a thickness variable member disposed between the planar surface of each clad, the thickness variable member comprising a material having a thickness that is configured to vary in response to irradiation with light,
wherein the material of the thickness variable member is configured to adjust a distance between the cores of the two coupling optical fibers to control a coupling degree of optical coupling between the two coupling optical fibers.

2. The optical coupling device according to claim 1, wherein the thickness variable member can vary a thickness between the two coupling optical fibers depending on any one of intensity, a wavelength, and emitting time of the irradiation light.

3. The optical coupling device according to claim 2, wherein, in the two coupling optical fibers, surfaces of clads in portions in contact with the thickness variable member are processed planarly.

4. The optical coupling device according to claim 3, wherein, in the two coupling optical fibers, surfaces of clads in portions in contact with the thickness variable member are processed planarly such that cores are exposed.

5. The optical coupling device according to claim 4, further comprising an irradiation optical fiber that irradiates the thickness variable member with the light.

6. An optical coupling system comprising:
an optical couple device comprising:
two coupling optical fibers each comprising a core and a clad, wherein each clad of the two coupling optical fibers comprises a planar surface and each planar surface is disposed to face one another;
a thickness variable member disposed between the planar surface of each clad, the thickness variable member comprising a material having a thickness that is configured to vary in response to irradiation with light, wherein the material of the thickness variable member is configured to adjust a distance between the cores of the two coupling optical fibers to control a coupling degree of optical coupling between the two coupling optical fibers;
an irradiation optical fiber that is configured to irradiate the thickness variable member with the light; and
a thickness controller that is configured to irradiate the thickness variable member with the light through the irradiation optical fiber.

7. The optical coupling system according to claim 6 further comprising a mobile terminal that instructs the thickness controller to emit or cut the light to or from the thickness variable member.

8. The optical coupling system according to claim 6, wherein the thickness variable member can vary a thickness between the two coupling optical fibers depending on any one of intensity, a wavelength, and emitting time of the irradiation light.

9. The optical coupling system according to claim 8, wherein, in the two coupling optical fibers, surfaces of clads in portions in contact with the thickness variable member are processed planarly.

10. The optical coupling system according to claim 9, wherein, in the two coupling optical fibers, surfaces of clads in portions in contact with the thickness variable member are processed planarly such that cores are exposed.

* * * * *